Figure 1:
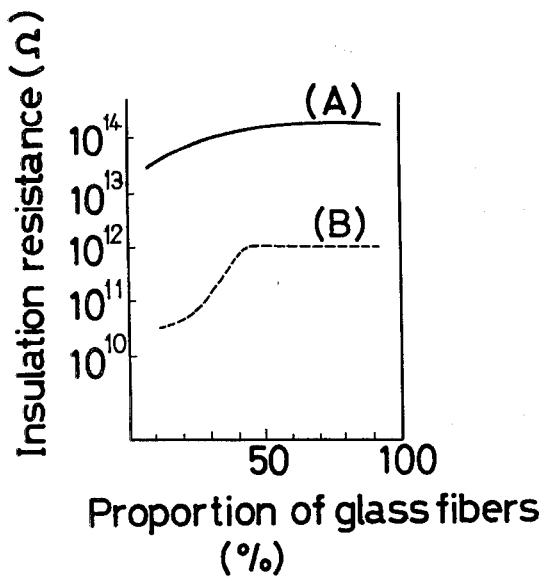

United States Patent [19]

Nohtomi

[11] 3,897,588

[45] July 29, 1975

[54] PROCESS FOR THE PRODUCTION OF LAMINATES UTILIZING PRE-TREATING FOLLOWED BY IMPREGNATION

[75] Inventor: Touru Nohtomi, Tokyo, Japan

[73] Assignee: Mitsubishi Gas Chemical Co., Inc., Tokyo, Japan

[22] Filed: Feb. 9, 1973

[21] Appl. No.: 331,030

[30] Foreign Application Priority Data

Feb. 12, 1972 Japan.................................. 47-14333

[52] U.S. Cl. ................. 428/436; 156/309; 156/330; 156/335; 162/145; 428/418; 428/901
[51] Int. Cl.² ... B32B 17/10; B32B 27/12; B32B 27/38; B32B 27/42
[58] Field of Search ...... 156/309, 335, 330; 161/93, 161/155, 170, 193, 196, 198, DIG. 4, 186, DIG. 7; 162/145

[56] References Cited
UNITED STATES PATENTS

| | | | |
|---|---|---|---|
| 2,859,109 | 11/1958 | Hawley et al. | 162/145 |
| 3,228,825 | 1/1966 | Waggoner | 162/145 |
| 3,393,117 | 7/1968 | Zolg et al. | 161/82 |
| 3,560,328 | 2/1971 | Anderson et al. | 161/251 |
| 3,617,613 | 11/1971 | Benzinger et al. | 174/68.5 |

*Primary Examiner*—Douglas J. Drummond
*Assistant Examiner*—Robert A. Dawson
*Attorney, Agent, or Firm*—Frank J. Jordan

[57] ABSTRACT

A process for the production of laminates composed of sheets made of cellulose and glass fibers by pretreating the sheets with a melamine resin or a methylol group-rich phenolic resin, impregnating the pretreated sheets with a thermosetting resin and then laminating the impregnated sheets to produce the laminates. In one embodiment, the laminates are covered with a resin-treated glass fabric on at least one of the outermost surfaces or are further covered with a copper foil on the glass fabric-covered surface.

19 Claims, 4 Drawing Figures

PROCESS FOR THE PRODUCTION OF LAMINATES UTILIZING PRE-TREATING FOLLOWED BY IMPREGNATION

This invention relates to a process for the production of laminates. More particularly, it relates to a process for the manufacture of a laminate having superior machinability, heat resistance and dimensional stability characterized by pre-treating sheets made of mixed glass and cellulose fibers, with a melamine resin and/or a phenolic resin having relatively many methylol groups in the molecule, thereafter impregnating the pre-treated sheets with a thermosetting resin and then laminating the impregnated sheets alone or together with glass fabric previously treated with a thermosetting resin.

Glass fabric-base epoxy laminates have heretofore been used as a base material for printed circuits or insulators for use in highly delicate electronic apparatuses such as electronic computers and controllers. However, it is disadvantageous that they are unsatisfactory in machinability and are especially difficult to subject to cold punching. Thus, as laminates having an improved machinability, there have been proposed glass fiber-base epoxy laminates consisting essentially of non-woven and woven glass fabrics (see Japanese Utility Model Gazette 32228/68). These laminates are somewhat improved but still unsatisfactory in machinability and are poor in dimensional stability due to their increased content of non-woven glass fabrics. Such non-woven cloths are webs or mats in which the fibers arranged in parallel, crosswise or at random with respect to each other are together bonded by the use of a suitable binder. The suitable binder is usually a water-soluble binder, and non-woven glass fabrics are thus inferior in waterproof property and heat resistance.

Further, in Japanese Patent Gazette 9957/71, there is disclosed a process for the manufacture of a laminate which is made of non-woven glass fabrics and glass fabrics and in which the positioning and amount of the non-woven glass fabrics used are specified, the process being intended to thereby produce new laminates which are the same as those described in said Japanese Utility Model Gazette 32228/68 except that the new laminates are improved in dimensional stability. Laminates produced by this process are improved in dimensional stability and, on the other hand, they are deteriorated in machinability due to their increased content of glass fabrics and are not sufficiently improved in waterproof property and heat resistance due to the use of non-woven glass fabrics as the base material.

As a result of various studies made by the present inventors in an attempt to eliminate the disadvantages of the conventional laminates, it has been found that both the use of sheets made of mixed glass and cellulose fibers (the sheets being hereinafter referred to as "glass-cellulose sheets") as the base material, and the pre-treatment of the glass-cellulose sheets with a melamine resin and/or a phenolic resin having relatively many methylol groups in the molecule (the phenolic resin being hereinafter referred to as "methylol group-rich phenolic resin") prior to the impregnation of the sheets with a thermosetting resin will lead to the production of a laminate of the glass-cellulose sheets, which laminate has superior machinability, heat resistance and dimensional stability without damaging its electrical properties.

More particularly, the object of this invention can be accomplished by using as the base material a plurality of glass-cellulose sheets made of 20–70% by weight of cellulose fibers and 30–80% by weight of glass fibers and employing the following three steps:

1. pre-treating the glass-cellulose sheets with a melamine resin and/or a methylol group-rich phenolic resin,
2. impregnating the pre-treated sheets with a thermosetting resin and drying the impregnated sheets to form prepregs, and then
3. laminating the prepregs and glass fabrics so that the outermost surfaces of a laminate to be obtained are each covered with the glass fabric.

Thus, the object of this invention will neither be attained unless a base material is subjected to such pretreatment as the step (1) even if the base material is glass-cellulose sheets according to this invention, nor will it be attained if the base material is other than the specified one according to this invention even if the base material is preliminarily treated with a melamine resin and/or a methylol group-rich phenolic resin.

According to this invention, it needs the use of the glass-cellulose sheets as the base material as well as the use of the above-mentioned three steps to obtain a laminate having excellent machinability, heat resistance, dimensional stability and electrical properties.

The glass-cellulose sheets which may be used as the base material in the practice of this invention are those obtained by making cellulosic and glass fibers into paper-like sheets. They contain none of such binders as used in conventional non-woven glass fabrics and consist solely of cellulosic and glass fibers. Thus, they are a substance distinct from the non-woven glass fabrics and are different in properties therefrom; for instance, the former have larger tensile strength than the latter. Glass fibers for general use in the glass-cellulose sheets are about 5 to 13$\mu$ in diameter and 5 to 30 mm in length. Cellulose fibers which may be used include linters, kraft fibers and the mixtures thereof with the linters being preferable.

The glass-cellulose fiber sheets according to this invention should contain glass fibers in amounts of 30–80%, preferably 40–80% and more preferably 60–70% by weight. The use of glass fibers in amounts of less than 30% by weight will give a laminate having decreased electrical properties and heat resistance and, on the other hand, the use of more than 80% by weight of glass fibers will produce a laminate having decreased machinability and dimensional stability.

The pre-treatment of the glass-cellullose sheets is to impregnate them with a varnish of a melamine resin and/or a methylol group-rich phenolic resin and then dry the impregnated sheets. The melamine resins which may be used in this pretreatment step are those which are prepared from formaldehyde and melamine in a molar ratio of from 1 to 6, preferably, from 1 to at least 3 in the presence of acid catalyst. Methyl group-rich phenolic resins which may be used are those which are prepared from formaldehyde and phenol in a molar ratio of from 1.3 to 3.0, preferably from 1.5 to 3.0 and more preferably from 2.0 to 2.5 in the presence of alkali catalyst. The use of usual phenolic resins prepared from formaldehyde and phenol in a molar ratio of from 1 to 1.3 will give laminates having lowered electrical properties. The methylol group-rich phenolic resins have 1.7 to 2.7 methylol groups in the nucleus. As the resins employed in the pre-treating step the methylol group-rich phenolic resins are preferred to the melamine resins.

The amount of resin impregnated into the glass-cellulose fiber sheets in the pre-treatment step, represented by the formula $$\frac{\text{Amount by weight of resin impregnated}}{\text{Weight of base material} + \text{Amount by weight of resin impregnated}} \times 100\%$$

is in the range of from 2 to 40%, preferably from 5 to 25% by weight of the pre-treated sheets. The use of less than 2% by weight of the resin in the pre-treatment step will give the laminates having poor moisture resistance, while the use of more than 40% by weight thereof will give the laminates with lowered electrical properties and heat resistance.

In addition, the glass-cellulose sheets may, prior to the pre-treating step, be treated with Volane (methacrylatechromic chloride) or silane, with the silane being preferred.

The pre-treated sheets are impregnated with a varnish of a thermosetting resin and dried to obtain a prepreg.

Thermosetting resins which may be used in the impregnating step, include the usual ones such as epoxy, phenolic, polyimide, polyamide and polyester resins, with expoxy and phenolic resins being preferable and the former being more preferable.

The total amount of resins impregnated into the prepregs in the pre-treating and impregnating steps, represented by the formula $$\frac{\text{Total amount by weight of resins impregnated}}{\text{Weight of base material} + \text{Total amount by weight of resins impregnated}} \times 100\%,$$

is in the range of 30–80% by weight, preferably 40–70% by weight of the prepregs. The use of the total resins in amounts of less than 30% by weight will produce the laminates having lowered electric properties and, on the other hand, the total resin in amount of more than 80% by weight may reduce the moldability of prepregs in lamination, and lower the dimensional stability of the laminate to be obtained.

By laminating a combination of the prepregs of glass-cellulose paper and previously resin-treated glass fabric prepregs while the glass fabric prepreg is positioned on at least one of the outermost ones of the glass-cellulosic paper prepregs, there will be obtained the laminates having desired properties such as superior machinability, heat resistance, dimensional stability and electrical properties.

In such a laminate covered with a glass fabric on at least one of the outermost surfaces, the inner layer or layers of the laminate may contain other glass fabric. However, said inner layer or layers should preferably consist solely of the glass-cellulose sheets to allow the laminate to have excellent machinability. The above-mentioned pretreating condition according to this invention may be effected at temperatures of 80° to 130°C, for 5 to 15 minutes, and the impregnating condition may be effected at temperatures of 100 to 160°C, for 5 to 15 minutes.

The resins which may be used in treating the glass fabrics may be the thermosetting resins as used in the impregnation of glass-cellulose sheets. The thermosetting resins, include epoxy, phenolic, polyimide, polyamide and polyester resins. Among these resins, an epoxy resin is especially preferred.

The amount of resin impregnated into the glass fabric, represented by the formula $$\frac{\text{Amount by weight of resin impregnated}}{\text{Weight of glass fabric} + \text{Amount by weight of resin impregnated}} \times 100\%,$$

is in the range of 20–80% by weight, preferably 30–60% by weight of glass fabric prepreg. The use of less than 20% by weight of the resin will produce the laminate of lowered electrical properties, while the use of more than 80% by weight thereof will result in lowered moldability.

According to this invention, there can be obtained the laminates of glass-cellulosic sheets or those wherein the outermost surfaces are covered with the glass fabric. If desired, there can also be obtained such laminates wherein at least one of the outermost surfaces is further covered with a metallic foil such as copper or nickel foil.

The lamination according to this invention may be effected at a temperature of 140°–180°C and pressure of 20–150 kg/cm² for a time length of 30–120 minutes.

The features and advantages of this invention will be apparent to those skilled in the art from the following description of preferred embodiments thereof, taken in conjunction with the drawings.

In the drawings:

FIGS. 1 to 4 generally show the insulation resistance, heat resistance, shearing stress and dimensional stability of various laminates produced using as the base material various glass-cellulose sheets wherein the mixing ratio of the glass and cellulose fibers is varied and under the same conditions as in the following Examples. These FIGURES will be detailed as follows.

Figure 2:
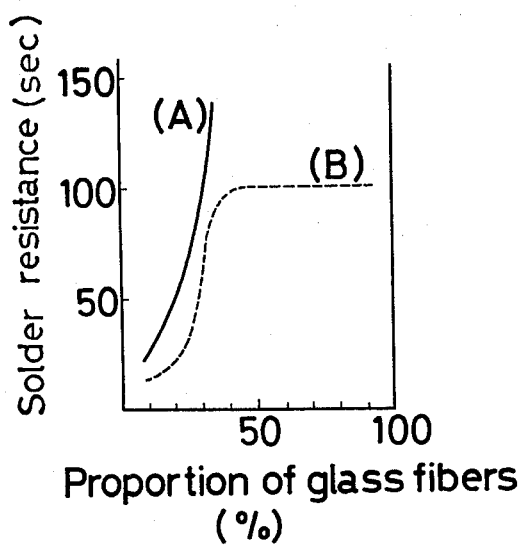
Figure 3:
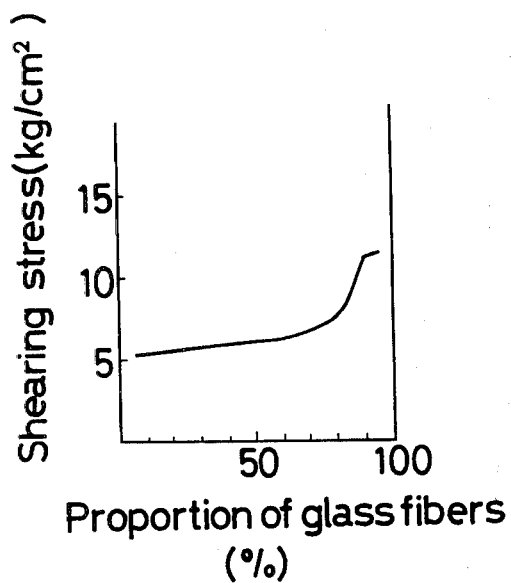
Figure 4:
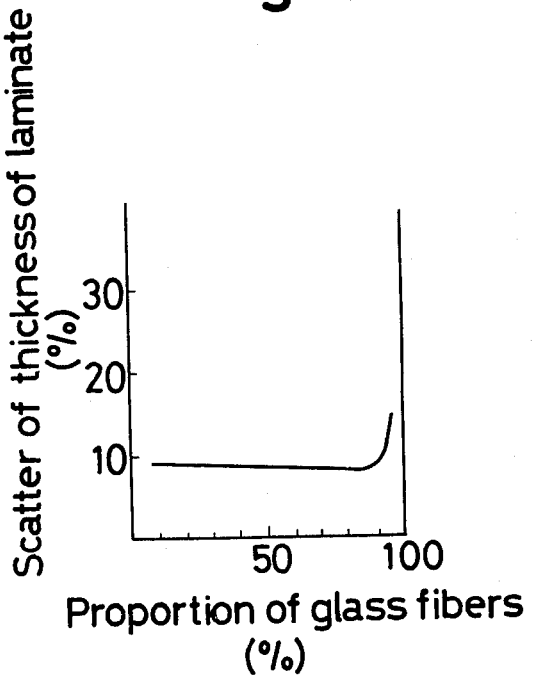

FIG. 1 shows the variations of the insulation resistance with varying proportion of glass fibers in glass-cellulose sheets, as measured by the method prescribed as JIS-CC-6481 (Japanese Industrial Standard-C-6481), the variation (A) being for the laminate as received and the other (B) for the same one after boiled for two hours. It is seen that when the proportion of glass fibers is small the insulation resistance after 2 hours' boiling is considerably lowered;

FIG. 2 shows the variations of solder resistance at 260°C with varying proportion of glass fibers in glass-cellulose sheets, the variation (A) being for the laminate as received and the other (B) for the same one after boiled for 2 hours, and shows that when the proportion of glass fibers is less than 30% the solder resistance remarkably decreases;

FIG. 3 shows the variation of shearing stress at room temperature, which is an indicator of machinability, with varying proportion of glass fibers in glass-cellulose sheets, and also indicates that when the proportion of glass fibers is more than 80% the shearing stress sharply increases thereby requiring a powerful stamping press for punching the laminate, increasing the wear of a mold used and causing the cracking and peeling of the laminate; and FIG. 4 shows the variation of scatter of the thickness of laminates obtained by laminating, with varying proportion of glass fibers in glass-cellulose sheets, the scatter of the thickness being represented by the formula $$\frac{\text{Maximum thickness} - \text{Minimum thickness}}{\text{Average thickness}} \times 100\%.$$

The FIGURE indicates that the use of more than 90% by weight of glass fibers in the laminates sharply increases the scatter of the thickness thereof.

Table 1 shows the comparison of properties between the laminates (Example 1) produced according to this invention, those (Comparison example 1) produced from the glass-cellulose sheets without the pre-treatment as previously mentioned and the conventional ones (Comparison example 2) produced from non-woven glass fabrics.

As is apparent from Table 1, the laminates produced from the glass-cellulose sheets without the pre-treatment are inferior in various properties to the conventional ones produced from the non-woven glass fabrics, while those produced from the glass-cellulose sheets after being subjected to the pre-treatment according to this invention are superior to said conventional ones in machinability, heat resistance and dimensional stability and electrical properties.

In addition, according to this invention, such superior laminates can be produced at a lower cost.

This invention will be better understood by the following examples wherein all percentages are by weight unless otherwise specified.

EXAMPLE 1

Glass-cellulose sheets (0.25 mm thick) composed of 40% of cellulose fibers and 60% of glass fibers were impregnated with a phenolic resin prepared from formaldehyde and phenol in the molar ratio of 2.5 and the resulting impregnated sheets were dried. The sheets thus pre-treated were impregnated with a heat resistant epoxy resin and then dried to form glass-cellulose sheet (or paper) prepregs (0.3 mm thick).

Glass fabrics (0.18 mm thick) were impregnated with a heat resistant epoxy resin and then dried to form glass fabric prepregs.

Eight of said glass-cellulose sheet prepregs were piled one upon another, the uppermost and lowermost layers of the resulting pile were each coverd with the glass fabric prepreg and then said fabric prepregs were each further covered with a copper foil to form a mass for lamination which was then laminated at a temperature of 160°C and pressure of 40 kg/cm$^2$ for a time length of 90 minutes thereby obtaining a copper-clad laminate. The laminates thus obtained were tested and the results were shown in Table 1.

Table 1

| | | Example 1 | Comparison example 1 | Comparison example 2 |
|---|---|---|---|---|
| Constitution | Inner layer | Glass-cellulose sheet | Glass-cellulose sheet | Non-woven glass fabrics |
| | Outer layers | Glass fabric | Glass fabric | Glass fabric |
| Pre-treatment according to this invention | | Pre-treated | None | None |
| Finished thickness (mm) | | 1.6 | 1.6 | 1.6 |
| Test for perforation by use of super hard drill (Number of perforations*) | | 10000 or more | | 2000 or less |
| Solder resistance 260°C (sec) | As received | 120 or more | 40–50 | 120 or more |
| | After two hours' boiling | 80–100 | 0–5 | 40–50 |
| Scatter of thickness of laminate (%) | | 8 | | 35 |
| Insulation resistance (Ω) | As received | $3.0 \times 10^{14}$ | $1.9 \times 10^{13}$ | $6.3 \times 10^{13}$ |
| | After two hours' boiling | $1.2 \times 10^{12}$ | $7.0 \times 10^{11}$ | $1.1 \times 10^{11}$ |
| Surface resistance (Ω) | As received | $6.0 \times 10^{13}$ | $3.1 \times 10^{12}$ | $2.4 \times 10^{14}$ |
| | After exposure to 40°C and 90% RH for 96 hours | $3.8 \times 10^{12}$ | $1.6 \times 10^{11}$ | $3.5 \times 10^{11}$ |
| Volume resistivity (Ω cm) | As received | $8.3 \times 10^{14}$ | $2.0 \times 10^{13}$ | $6.5 \times 10^{15}$ |
| | After exposure to 40°C and 90% RH for 96 hours | $4.2 \times 10^{14}$ | $4.9 \times 10^{11}$ | $8.2 \times 10^{13}$ |
| Peel strength of copper foil (kg/cm) | | 1.8–2.0 | 1.7–2.1 | 1.7–1.8 |
| Flexural elastic modulus (kg/mm$^2$) | | 2600 | | 1700 |

*Number of perforations made trimly in the laminate without causing cracks and peeling therein.

COMPARISON EXAMPLE 1

Glass-cellulose sheets (0.25 mm thick) composed of 40% of cellulose fibers and 60% of glass fibers were impregnated with a heat resistant epoxy resin without the pre-treatment according to this invention and were then dried to form glass-cellulose paper (or sheet) prepregs (0.3 mm thick), and glass fabric prepregs were prepared in the same manner as in Example 1. The sheet prepregs and the glass fabric prepregs were treated as in Example 1 to form a copper-clad laminate having the same thickness as the one in Example 1. The properties of the thus-formed laminate are indicated in Table 1.

COMPARISON EXAMPLE 2

Non-woven glass fabrics (0.25 mm thick) were impregnated with a heat resistant epoxy resin without the pre-treatment according to this invention and then dried to form non-woven glass fabric prepregs (0.3 mm thick), while glass fabrics were treated under the same conditions as in Example 1 to form glass fabric prepregs. Non-woven glass fabric prepregs and the glass fabric prepregs were treated as in Example 1 to obtain a copper-clad laminate having the same thickness as the one obtained in Example 1. The properties of the laminate of Comparison example 2 are also shown in Table 1.

EXAMPLE 2

Glass-cellulose sheets (0.25 mm thick) composed of 30% by weight of cellulose fibers and 70% by weight of glass fibers were pre-treated with a phenolic resin as in Example 1, impregnated with an epoxy resin as in Example 1 and then dried to form glass-cellulose prepregs.

Eight of said prepregs were treated in the same manner as in Example 1 to obtain a copper-clad laminate.

The laminate had an insulation resistance of $3.8 \times 10^{14}\Omega$ in the as-received state and $4.9 \times 10^{12}\Omega$ after boiled for 2 hours; a surface resistance of $8.6 \times 10^{13}\Omega$ in the as-received state and $6.2 \times 10^{12}\Omega$ after exposed to 40°C under a 90% RH, for 96 hours; a volume resistivity of $9.2 \times 10^{14}\Omega.cm$ in as-received state and $5.7 \times 10^{14}\Omega.cm$ after exposed to 40°C under a 90% RH, for 96 hours; and a solder resistance of at least 120 sec. at 260°C and 80–100 sec. after boiled for 2 hours.

EXAMPLE 3

Glass-cellulose sheets as in Example 1 were pre-treated with a melamine resin prepared from formaldehyde and a modified melamine (Melolam 297). The pre-treated sheets were impregnated with an epoxy resin as in Example 1 and then dried to form glass-cellulose sheet prepregs. Said prepregs were treated in the same manner as in Example 1 to obtain a copper-clad laminate.

The laminate had an insulation resistance of $2.5 \times 10^{14}\Omega$ in the as-received state and $1.5 \times 10^{11}\Omega$ after boiled for 2 hours; a surface resistance of $6.4 \times 10^{13}\Omega$ in the as-received state and $4.0 \times 10^{11}\Omega$ after exposed to 40°C under a 90% RH, for 96 hours; a volume resistivity of $5.8 \times 10^{14}\Omega.cm$ in the as-received state and $5.0 \times 10^{13}\Omega.cm$ after exposed to 40°C under a 90% RH, for 96 hours; and a solder resistance of at least 120 sec. at 260°C and 80–100 sec. after boiled for 2 hours.

EXAMPLE 4

Glass-cellulose sheets as in Example 1 were pre-treated with a phenolic resin prepared from formaldehyde and phenol in the molar ratio of 2. The sheets so pre-treated were then treated in the same manner as in Example 1 to obtain a copper-clad laminate.

The laminate showed an insulation resistance of $3.1 \times 10^{14}\Omega$ in the as-received state and $7.8 \times 10^{11}\Omega$ after boiled for 2 hours; a surface resistance of $1.3 \times 10^{13}\Omega$ in the as-received state and $2.7 \times 10^{12}\Omega$ after exposed to 40°C under a 90% RH, for 96 hours; a volume resistivity of $2.5 \times 10^{14}\Omega.cm$ in the as-received state and $4.8 \times 10^{13}\Omega.cm$ after exposed to 40°C under a 90% RH, for 96 hours; and a solder resistance of at least 120 sec. at 260°C and 80–100 sec. after boiled for 2 hours.

EXAMPLE 5

The procedure of Example 1 was followed, except that the copper foil was substituted by a nickel foil (0.035 mm thick) to obtain a nickel-clad laminate.

The laminate showed an insulation resistance of $2.6 \times 10^{14}\Omega$ in the as-received state and $1.4 \times 10^{12}\Omega$ after boiled for 2 hours; a surface resistance of $4.9 \times 10^{13}\Omega$ in the as-received state and $2.7 \times 10^{12}\Omega$ after exposed to 40°C under a 90% RH, for 96 hours; a volume resistivity of $7.1 \times 10^{14}\Omega.cm$ in the as-received state and $3.5 \times 10^{14}\Omega.cm$ after exposed to 40°C under a 90% RH, for 96 hours; and a solder resistance of at least 120 sec. at 260°C and 90–120 sec. after boiled for two hours.

EXAMPLE 6

The procedure of Example 1 was followed, but substituting the epoxy resin by the same phenolic resin as previously mentioned to obtain a copper-clad laminate which had the following properties:

| | |
|---|---|
| Insulation resistance | |
| (in the as-received state) | $4.8 \times 10^{12}\Omega$ |
| (after 2 hrs' boiling) | $3.6 \times 10^{10}\Omega$ |
| Surface resistance | $1.7 \times 10^{12}\Omega$ |
| | $3.8 \times 10^{11}\Omega$ |
| Volume resistivity | $1.0 \times 10^{13}\Omega.cm$ |
| | $4.5 \times 10^{11}\Omega.cm$ |

What is claimed is:

1. A process for the production of laminates comprising the steps of:

pre-treating glass-cellulose sheets composed of 20–70% by weight of cellulosic fibers and 30–80% by weight of glass fibers with at least one member selected from the group consisting of melamine resins prepared from formaldehyde and melamine in a molar ratio of from 1 to 6 in the presence of an acid catalyst, and methylol group-rich phenolic resins prepared from formaldehyde and phenol in a molar ratio of from 1.3 to 3.0 in the presence of an alkali catalyst, impregnating the pre-treated sheets with an epoxy resin, drying the impregnated sheets to form prepregs thereof, arranging the prepregs for lamination, placing on the outermost ones of the arranged prepregs a glass fabric previously treated with the epoxy resin as used in the impregnation step, and laminating the arranged prepregs with the resin-treated glass fabric on the outermost prepregs to produce the laminate.

2. A process for the production of metal-clad laminates comprising the steps of:

pretreating glass-cellulose sheets composed of 20–70% by weight of cellulosic fibers and 30–80% by weight of glass fibers with at least one member selected from the group consisting of melamine resins prepared from formaldehyde and melamine in a molar ratio of from 1 to 6 in the presence of an acid catalyst, and methylol group-rich phenolic resins prepared from formaldehyde and phenol in a molar ratio of from 1.3 to 3.0 in the presence of an alkali catalyst, impregnating the pre-treated sheets with a thermosetting synthetic resin, drying the impregnated sheets to form prepregs thereof, arranging the prepregs for lamination, placing on the outer surface of each of the outermost ones of the arranged prepregs a glass fabric previously treated with the same thermosetting synthetic resin as used in the impregnating step, covering with a metal foil the outer surface of at least one of the glass fabrics placed on said outermost prepregs, and laminating the prepregs, glass fabrics and metal foil or foils so position to produce the metal-clad laminate.

3. A process for the production of laminates according to claim 1, wherein the amount of resin impregnated into the sheets in the pre-treating step is from 20 to 70% by weight of the sheets.

4. A process for the production of laminates according to claim 1, wherein the total amount of resins impregnated into the sheets in the pre-treating and impregnating steps is from 30 to 80% by weight of the prepregs.

5. A process for the production of metal-clad laminates according to claim 2, wherein the amount of resin impregnated into the sheets in the pre-treating step is from 20 to 70% by weight of the sheets.

6. A process for the production of metal-clad laminates according to claim 2, wherein the total amount of resins impregnated into the sheets in the pre-treating and impregnating steps is from 30 to 80% by weight of the prepregs.

7. A process for the production of laminates according to claim 1, wherein the amount of resin impregnated into the glass fabric is from 20 to 80% by weight thereof.

8. A process for the production of metal-clad laminates according to claim 2, wherein the amount of resin impregnated into the glass fabric is from 20 to 80% by weight thereof.

9. A process for the production of laminates according to claim 1, wherein the methylol group-rich phenolic resins have 1.7 to 2.7 methylol groups in the nucleus.

10. A process for the production of metal-clad laminates according to claim 2, wherein the methylol group-rich phenolic resins have 1.7 to 2.7 methylol groups in the nucleus.

11. A process for the production of metal-clad laminates according to claim 2, wherein the thermosetting used in the impregnating step is an epoxy resin.

12. A process for the production of metal-clad laminates according to claim 2, wherein the metal foil is selected from the group consisting of copper and nickel.

13. A process for the production of laminates according to claim 1, wherein the glass-cellulose sheets are composed of 20 to 60% by weight of cellulose fibers and 40 to 80% by weight of glass fibers.

14. A process for the production of metal-clad laminates according to claim 2, wherein the glass-cellulose sheets are composed of 20 to 60% by weight of cellulose fibers and 40 to 80% by weight of glass fibers.

15. A process for the production of laminates according to claim 1, wherein the methylol group-rich phenolic resins are prepared from formaldehyde and phenol in a molar ratio of 1.5 to 3.0 in the presence of alkali catalyst.

16. A process for the production of metal-clad laminates according to claim 2, wherein the methylol group-rich phenolic resins are prepared from formaldehyde and phenol in a molar ratio of 1.5 to 3.0 in the presence of alkali catalyst.

17. A metal-clad laminate obtained by the process of claim 2.

18. A process according to claim 1 including the step of drying said glass cellulose sheets after said pretreating step and before said impregnating step.

19. A process according to claim 2 including the step of drying said glass cellulose sheets after said pretreating step and before said impregnating step.

* * * * *